Dec. 28, 1926.
H. N. PARSONS
1,612,465
BALL BEARING MOUNTING
Filed Nov. 7, 1924
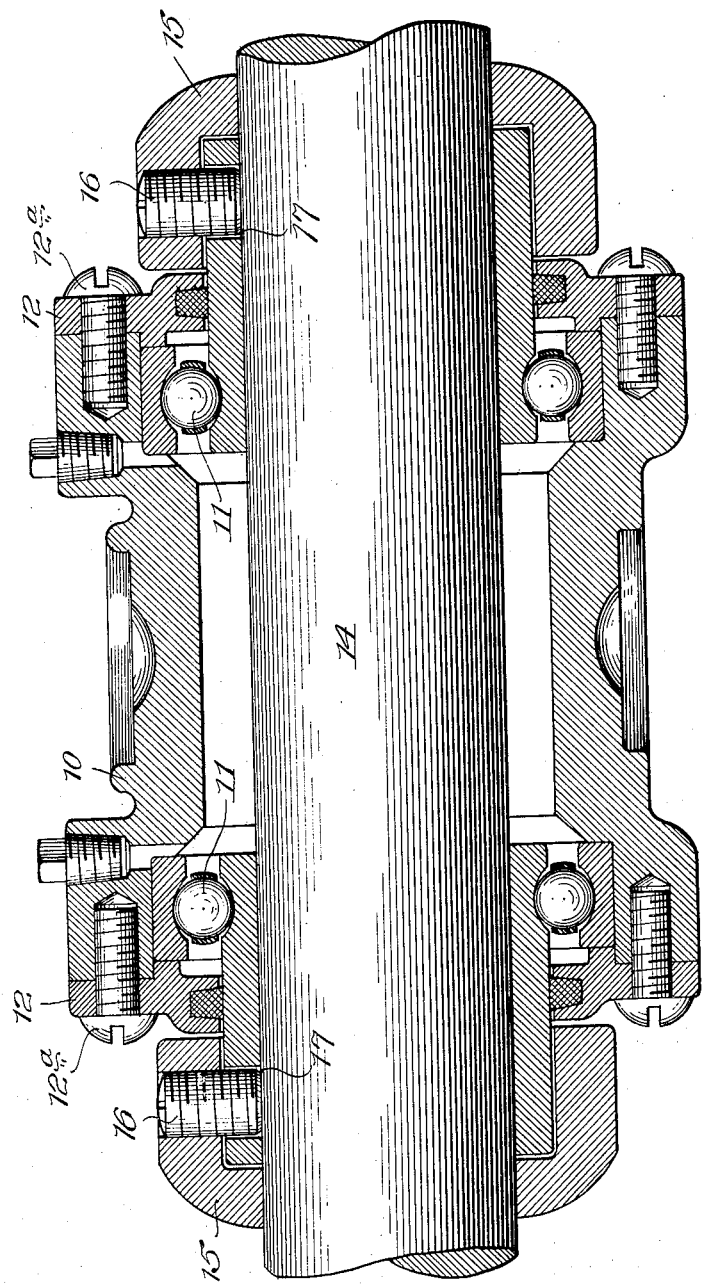
Inventor:
Harry N. Parsons, Patented Dec. 28, 1926.

1,612,465

UNITED STATES PATENT OFFICE.

HARRY N. PARSONS, OF CHICAGO, ILLINOIS, ASSIGNOR, BY MESNE ASSIGNMENTS, TO MARLIN-ROCKWELL CORPORATION, OF JAMESTOWN, NEW YORK, A CORPORATION OF NEW YORK.

BALL-BEARING MOUNTING.

Application filed November 7, 1924. Serial No. 748,358.

This invention relates to a ball bearing mounting which is fully described in the following specification and shown in the accompanying drawing in which the figure is a longitudinal section through a bearing embodying the invention.

The device illustrated is a hanger box 10 nclosing ball bearings 11 which are retained therein by means of caps 12 which are secured thereon by means of screws 12ª.

The inner race member 13 is slidably mounted on a shaft 14 and extends out beyond the cap 12. A set collar 15 is secured to the shaft 14 by means of a set screw 16, the set collar overhanging the projecting and inner portion of the inner race member 13 so that the set screw 16 may pass through an opening 17 in the projected inner race member 13.

It will thus be seen that a convenient means is provided for loosely securing the inner race member to a shaft, so that while it is compelled to turn with the shaft it is free to align itself therewith. The overhanging portion of the set collar also encloses and protects the outer end of the inner race member 13 and prevents dirt from working over the same into the bearing housing.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In an anti-friction bearing mounting for line shafting and the like, an anti-friction bearing having inner and outer race-members, said inner race-member being adapted to fit a shaft, a housing for supporting the outer race-member, a set collar having a bearing on the shaft outside the inner race member and having a portion overhanging the outer portion of said inner race-member, and a set screw carried by said overhanging portion for loosely engaging said inner race-member to prevent rotation thereof relative to said set collar.

2. In an anti-friction bearing mounting for line shafting and the like, an anti-friction bearing having inner and outer race-members, said inner race-member being adapted to fit a shaft, a housing for supporting the outer race-member, a set collar having a bearing on the shaft outside the inner race member and having a portion overhanging the outer portion of said inner race-member, and a set screw passing through said overhanging portion of the set collar and through an opening in the inner race-member, said set screw being adapted to retain said set collar on the shaft and to prevent rotation of said inner race-member on the shaft but permitting said inner race member to center itself on the shaft.

HARRY N. PARSONS.